US012101290B2

(12) United States Patent
Kong (10) Patent No.: US 12,101,290 B2
(45) Date of Patent: Sep. 24, 2024

(54) APPARATUS AND METHOD FOR CHEERING COMMUNICATION

(71) Applicant: Youngho Kong, Seoul (KR)

(72) Inventor: Youngho Kong, Seoul (KR)

(*) Notice: Subject to any disclaimer, the term of this patent is extended or adjusted under 35 U.S.C. 154(b) by 0 days.

(21) Appl. No.: 18/436,877

(22) Filed: Feb. 8, 2024

(65) Prior Publication Data

US 2024/0275756 A1 Aug. 15, 2024

(30) Foreign Application Priority Data

Feb. 10, 2023 (KR) .................. 10-2023-0017900
May 12, 2023 (KR) .................. 10-2023-0061710

(51) Int. Cl.
*H04L 51/52* (2022.01)
*G06Q 30/0207* (2023.01)
*G06Q 50/00* (2024.01)
*H04W 4/029* (2018.01)

(52) U.S. Cl.
CPC ......... *H04L 51/52* (2022.05); *G06Q 30/0239* (2013.01); *G06Q 50/01* (2013.01); *H04W 4/029* (2018.02)

(58) Field of Classification Search
USPC ........................................................ 709/206
See application file for complete search history.

(56) References Cited

U.S. PATENT DOCUMENTS

| 6,728,518 | B1* | 4/2004 | Scrivens | ............... H04B 1/086 |
| | | | | D14/138 |
| 9,497,143 | B2* | 11/2016 | Chung | ............... H04L 12/1822 |
| 10,187,336 | B2* | 1/2019 | Hasegawa | ........... H04L 12/1818 |

(Continued)

FOREIGN PATENT DOCUMENTS

KR   10-2010-0122143 A   11/2010
KR   101104690 B1 *   1/2012

(Continued)

OTHER PUBLICATIONS

"Son Na-eun and Jeong Eun-ji, gifts from Celeb Alarm certification event . . . 'Hot competition", https://entertain.naver.com/read?oid=108&aid=0002790253, Naver TV Entertainment, 2019, 4 pages.

(Continued)

*Primary Examiner* — Melvin H Pollack
(74) *Attorney, Agent, or Firm* — Sughrue Mion, PLLC (57) ABSTRACT

The present invention relates to a cheering communication apparatus, and the cheering communication apparatus includes: a menu identifier configured to identify any one menu selected by a user among a plurality of menus as a selected menu; and a controller configured to, in response to the identification, control a screen corresponding to the selected menu to be displayed on a screen of a user terminal possessed by the user, wherein, in a case where the selected menu is a Text menu, the controller provides a text writing screen, and in a case where, after cheering-related text information is input on the text writing screen, a request to send the cheering-related text information is made, for a receiver in the text information to check a text message corresponding to the text information, the controller sends the text message to a receiver terminal corresponding to an account of the receiver.

1 Claim, 7 Drawing Sheets

(56) References Cited

U.S. PATENT DOCUMENTS

| | | | | |
|---|---|---|---|---|
| 10,503,377 | B2* | 12/2019 | Whalin | G06F 3/04847 |
| 10,515,081 | B2* | 12/2019 | Birchall | H04L 12/1859 |
| 10,581,986 | B2* | 3/2020 | Tasdemiroglu | H04L 67/52 |
| 10,637,932 | B2* | 4/2020 | Platt | C07F 7/0816 |
| 10,713,386 | B2* | 7/2020 | Bailey | G06F 16/9535 |
| 10,824,330 | B2* | 11/2020 | Penilla | B60L 53/64 |
| 10,824,654 | B2* | 11/2020 | Chang | G06F 16/955 |
| 10,832,222 | B1* | 11/2020 | Knas | G06F 16/29 |
| 10,841,404 | B2* | 11/2020 | Howard | H04L 67/75 |
| 10,863,354 | B2* | 12/2020 | Kao | H04W 12/08 |
| 10,963,529 | B1* | 3/2021 | Amitay | G06Q 50/01 |
| 10,979,752 | B1* | 4/2021 | Brody | H04N 21/44218 |
| 11,082,390 | B2* | 8/2021 | Richard | H04L 51/046 |
| 11,095,696 | B2* | 8/2021 | Parra | H04L 67/306 |
| 11,122,009 | B2* | 9/2021 | Gurevich | G06F 16/313 |
| 11,132,711 | B2* | 9/2021 | Tseng | G06Q 50/01 |
| 11,159,909 | B2* | 10/2021 | Anderson | G01S 19/35 |
| 11,169,675 | B1* | 11/2021 | Anvaripour | H04L 51/52 |
| 11,263,543 | B2* | 3/2022 | Pinckney | G06F 16/9535 |
| 11,297,253 | B2* | 4/2022 | Song | H04N 23/611 |
| 11,343,220 | B2* | 5/2022 | Anerella | G06Q 10/10 |
| 11,375,288 | B1* | 6/2022 | Buckhouse | H04N 21/4758 |
| 11,393,048 | B2* | 7/2022 | Li | H04W 4/02 |
| 11,406,896 | B1* | 8/2022 | Cheung | G06V 40/20 |
| 11,409,825 | B2* | 8/2022 | Kelly | G06F 16/906 |
| 11,443,246 | B2* | 9/2022 | Gueye | G06Q 50/01 |
| 11,449,118 | B2* | 9/2022 | Vaccari | G06F 1/3209 |
| 11,552,919 | B1* | 1/2023 | Shah | H04L 51/52 |
| 11,574,322 | B2* | 2/2023 | Ezra | G06Q 30/0201 |
| 11,606,220 | B2* | 3/2023 | Jorasch | H04L 12/1818 |
| 11,616,742 | B2* | 3/2023 | Manas | G06F 21/606 709/206 |
| 11,639,981 | B2* | 5/2023 | Wu | H04W 4/021 342/28 |
| 11,743,544 | B2* | 8/2023 | Mckenzie | H04N 21/4756 715/837 |
| 11,829,971 | B2* | 11/2023 | Braathen | G06Q 20/384 |
| 11,852,554 | B1* | 12/2023 | Guillaume | G06Q 50/01 |
| 11,876,941 | B1* | 1/2024 | Suiter | H04N 23/63 |
| 11,882,628 | B2* | 1/2024 | Pulitzer | H04L 67/306 |
| 11,893,208 | B2* | 2/2024 | Al Majid | G01C 21/32 |
| 11,900,483 | B2* | 2/2024 | Doken | G06F 16/783 |
| 2015/0317564 | A1* | 11/2015 | Chen | G06N 5/02 706/46 |
| 2016/0191958 | A1* | 6/2016 | Nauseef | G06V 40/20 725/116 |
| 2020/0036830 | A1* | 1/2020 | Hatanaka | G06F 3/04886 |
| 2020/0162890 | A1* | 5/2020 | Spencer | H04L 67/563 |
| 2021/0312552 | A1* | 10/2021 | Simpson | H04W 4/029 |
| 2022/0327640 | A1* | 10/2022 | Li | G06Q 50/01 |
| 2023/0016221 | A1* | 1/2023 | Taylor | G06V 20/68 |
| 2023/0041924 | A1* | 2/2023 | Wittstock | H04L 51/214 |
| 2023/0065298 | A1* | 3/2023 | Noimark | A63F 13/86 |
| 2023/0177621 | A1* | 6/2023 | Xiao | G06Q 30/0201 705/7.29 |
| 2023/0236555 | A1* | 7/2023 | Liu | H04L 67/125 700/83 |
| 2023/0336517 | A1* | 10/2023 | Yuan | H04L 51/52 |
| 2024/0017615 | A1* | 1/2024 | Nakhjiri | G06Q 50/01 |
| 2024/0054572 | A1* | 2/2024 | Goenka | G06F 40/295 |
| 2024/0089686 | A1* | 3/2024 | Kotani | H04N 21/4394 |
| 2024/0104454 | A1* | 3/2024 | Khang | G06Q 10/1053 |

FOREIGN PATENT DOCUMENTS

| | | | | |
|---|---|---|---|---|
| KR | 10-1130869 | B1 | | 3/2012 |
| KR | 20130039389 | A | * | 4/2013 |
| KR | 20140082537 | A | * | 7/2014 |
| KR | 20190063595 | A | * | 6/2019 |
| KR | 20190098788 | A | * | 8/2019 |
| KR | 102488989 | B1 | * | 1/2023 |
| WO | WO-2013147467 | A1 | * | 10/2013 ............ G06Q 50/01 |

OTHER PUBLICATIONS

[Lee Dong-hyung's News Head-to-head Competition] Jo Gyu-chan 'Old Singer' Comeback with New Song: "It's Not my story", YTN, 2020, https://n.news.naver.com/mnews/article/052/0001403686?SID=103, 22 pages.

Korean Office Action for KR 10-2023-0061710, dated Jul. 3, 2023.

Korean Decision to Grant a Patent for 10-2023-0061710, dated Jul. 21, 2023.

* cited by examiner

[PROCESS OF SENDING TEXT MESSAGE FROM USER TERMINAL]

APPARATUS AND METHOD FOR CHEERING COMMUNICATION

CROSS-REFERENCE TO RELATED APPLICATION

This application claims priority to and the benefit of Korean Patent Application No. 10-2023-0017900, filed on Feb. 10, 2023 and No. 10-2023-0061710, filed on May 12, 2023, the disclosure of which is incorporated herein by reference in its entirety.

BACKGROUND

1. Field of the Invention

The present invention relates to an apparatus and method for cheering communication, and more particularly, to an apparatus and method for cheering communication capable of providing a mobile social network service (SNS) fan club platform as a space that enables communication and cheering between a creator and a fan.

2. Discussion of Related Art

Most existing creators (artists) suffer from financial difficulties. Specifically, 73.6% of part-time artists, who account for half of the artist population, are unable to focus on artistic activities due to an income problem, the average of individual income of full-time/part-time artists through artistic activities was found to be 12.81 million won during the last year, and full-time/part-time artists whose individual income from artistic activities was less than 12 million won accounted for 72.7% of the artist population, which shows that the absolute majority of artists are under threat to survival beyond experiencing financial pain. Also, due to such financial problems, most creators spend most of their time doing livelihood activities rather than artistic activities and have been found to spend an average of 14.8 hours doing artistic activities and an average of 43.8 hours doing non-artistic activities, and 23.9% of the artist population has been found to be people with interrupted artistic career who have given up artistic activities for a year or more after becoming a creator.

Meanwhile, various social network service (SNS) platforms such as Instagram, Facebook, YouTube, Twitter, and TikTok exist as a space where creators can share their content. However, the existing known SNS platforms mostly have a [creator→fan] direction in which a creator delivers information to a fan and are mostly used for the purpose of delivering content by a creator rather than allowing communication between a creator and a fan.

Although meeting and communicating with a creator are valuable experiences for fans, the existing SNS platforms have a one-way direction in which a creator delivers content to fans and thus have a limitation in allowing sincere conversation (communication) between a creator and fans. As a result, for reasons such as difficulty to check whether a message sent to a creator is properly delivered to the creator, many users (especially, fans) using the existing SNS platforms are dissatisfied with communicating with a creator through comments under content or an existing 1:1 message. That is, effective means for supporting cheering and communication in a [fan→creator] direction that allows fans to cheer for and communicate with a creator has not been present conventionally.

The related art of the present invention has been disclosed in Korean Patent Registration No. 10-1130869.

SUMMARY OF THE INVENTION

The present invention is directed to an apparatus and method for cheering communication that allows a fan to more effectively cheer for and communicate with a creator (that is, effectively supports cheering and communication in a [fan→creator] direction) and allows income to be generated for the creator to be financially helpful to the creator.

However, the objectives of the present invention are not limited to those mentioned above, and other unmentioned objectives may be present.

According to an aspect of the present invention, there is provided a cheering communication apparatus including: a menu identifier configured to identify any one menu selected by a user among a plurality of menus as a selected menu; and a controller configured to, in response to the identification, control a screen corresponding to the selected menu to be displayed on a screen of a user terminal possessed by the user, wherein, in a case where the selected menu is a Text menu, the controller provides a text writing screen, and in a case where, after cheering-related text information is input on the text writing screen, a request to send the cheering-related text information is made, for a receiver in the text information to check a text message corresponding to the text information, the controller sends the text message to a receiver terminal corresponding to an account of the receiver.

Also, the user terminal may be a fan terminal possessed by a fan of the receiver who cheers for the receiver and wants to communicate with the receiver, and the receiver terminal may be a creator terminal possessed by a creator who engages in artistic activities and wants to communicate with fans.

Also, the text information may include at least one of receiver account ID information, text privacy setting information, a text title, text content, and a hashtag.

Also, upon completion of the sending of the text message to the receiver terminal, the controller may control the sent text message to be exposed on each of a Received Text item in a receiver account page corresponding to the account of the receiver and a Sent Text item in a user account page corresponding to an account of the user.

In addition, in a case where the request to send the text information is made after "public" is input as the text privacy setting information in the text information, the controller may send the text message to the receiver terminal for the text message to be able to be exposed on a screen of a terminal of each connected member connected to the receiver account page of the account of the receiver.

The above-described means for achieving the objectives of the present invention are only illustrative and not intended to limit the present invention. Embodiments other than the above-described exemplary embodiments may be present in the drawings and the detailed description of the invention.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings so that those of ordinary skill in the art to which the present invention pertains can easily carry out the present invention. However, the present invention may be implemented in various different forms and is not limited to the embodiments described herein. Also, in the drawings, in order to clearly describe the present invention, parts irrelevant to the description are omitted, and like parts are denoted by like reference numerals throughout the specification.

Throughout the specification, when a certain part is described as being "connected" to another part, this not only includes a case in which the part is "directly connected" to the other part, but also includes a case in which the part and the other part are "electrically connected" or "indirectly connected" to each other with another element disposed therebetween.

Throughout the specification, when a certain member is described as being "on," "on an upper portion of," "on an upper end of," "under," "on a lower portion of," or "on a lower end of" another member, this not only includes a case in which the member is in contact with the other member, but also includes a case in which another member is present between the two members.

Throughout the specification, when a certain part is described as "including" a certain component, unless particularly described otherwise, this means that the part may further include other components instead of excluding other components.

Figure 1:
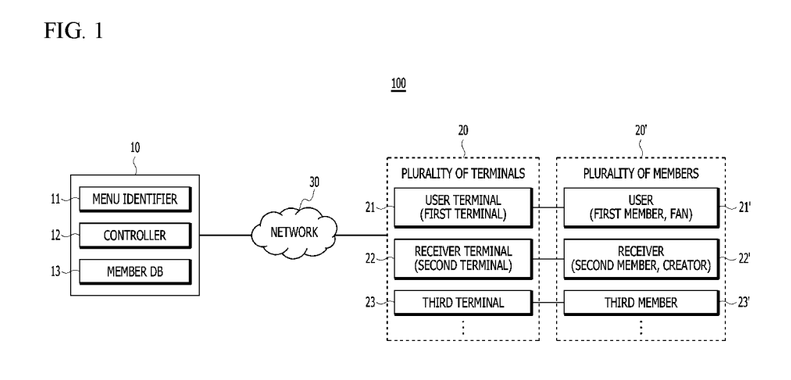
FIG. 1 is a view illustrating a schematic configuration of a cheering communication system including a cheering communication apparatus according to one embodiment of the present invention.

FIG. 1 is a view illustrating a schematic configuration of a cheering communication system 100 including a cheering communication apparatus 10 according to one embodiment of the present invention. FIGS. 2 to 6 are views schematically illustrating implementation examples of a cheering communication service provided by the cheering communication apparatus 10 according to one embodiment of the present invention.

Hereinafter, for convenience of description, the cheering communication apparatus 10 according to one embodiment of the present invention will be referred to as the present apparatus 10, and the cheering communication system 100 according to one embodiment of the present invention will be referred to as the present system 100. Also, even when description is omitted below, any matter illustrated in the drawings may identically apply to the description of the present apparatus 10.

Referring to FIGS. 1 to 6, the present system 100 may include the present apparatus 10 and a plurality of terminals 20.

The present apparatus 10 may be a cheering communication apparatus configured to provide a space that enables communication and cheering between a plurality of members 20' using the present apparatus 10. The plurality of members 20' using the present apparatus 10 may include a fan, a creator, and the like. Also, in the present invention, a member may also be referred to as a user or a service user.

The present apparatus 10 may provide a web page, an app page, a program, or an application relating to cheering communication (or provision of a cheering communication service) to each of the plurality of terminals 20 possessed by the plurality of members 20' using the present apparatus 10, and in this way, enable each of the plurality of members 20' to, through their own terminals, use the cheering communication service provided by the present apparatus 10. In the present invention, the web page, app page, program, and application relating to cheering communication that are provided by the present apparatus 10 may also be referred to as the present web page, the present app page, the present program, and the present application (present app), respectively, for convenience of description. Also, the cheering communication service provided by the present apparatus 10 may also be referred to as the present service, and for example, the name (service name) of the present service may be "CHEERS." Also, a platform (present platform) provided by the present apparatus 10 may also be referred to as a cheering communication platform, a cheering communication service provision platform, a mobile SNS fan club platform, or the like.

The plurality of members 20' are users using the present apparatus 10 and may refer to users (members) who have connected to the present web page, the present app page, the present program, or the present app through their own terminals and have completed signing up (joining as a member) to the present apparatus 10 with or without installing the present program or the present app. For example, as will be described below, a controller 12 in the present apparatus 10 may store and manage member information of each of the plurality of members 20' who have completed joining as a member to the present apparatus 10 in a member database (DB) 13. The member information may also be referred to as subscriber information, user information, or the like and may include the name, ID information, phone number (mobile phone number), and the like of a member. However, the member information is not limited thereto and may include various other pieces of information.

The plurality of terminals 20 may refer to the terminals possessed by the plurality of members 20'. The plurality of terminals 20 may include a first terminal 21 possessed by a first member 21', a second terminal 22 possessed by a second member 22', a third terminal 23 possessed by a third member 23', and the like.

In the present invention, a terminal of any one member among the plurality of members 20' may send a text message to a terminal of any other member, and accordingly, the other member may receive and check the text message sent by the member. In the present invention, the member sending the text message may also be referred to as a sender, a user, a fan, or the like. On the other hand, the other member receiving the text message may also be referred to as a receiver, a creator, or the like.

Hereinafter, in describing the present apparatus 10, for convenience of description, a case where the member sending the text message is the first member 21' among the plurality of members 20', and the other member receiving the text message is the second member 22' among the plurality of members 20' will be described as an example. That is, hereinafter, in describing the present apparatus 10, for convenience of description, a case where the first member 21' is a fan (user) of the second member 22' (creator) and sends a text message to the second member 22', and the second member 22' is a creator receiving the text message from the first member 21', who is the fan, will be described as an example.

In the present invention, each of the plurality of members 20' may be distinguished as a sender or a receiver according to whether each of the plurality of members 20' is a person sending a text message or a person receiving a text message. This is only one example for helping understanding of the present invention, the present invention is not limited thereto, and each of the plurality of members 20' may be a sender or a receiver. That is, each of the plurality of members 20' may transmit or receive a text message. In other words, in the present invention, description relating to any one terminal (or any one member) among the plurality of terminals (or the plurality of members) may, even when description is omitted below, identically apply to description of each of the plurality of terminals (or the plurality of members), and vice versa. That is, description relating to each of the first member 21' or the second member 22' may identically apply to description of each of the plurality of members 20'.

The first terminal 21 may refer to the terminal possessed by the first member 21'. As mentioned above, in the present invention, for example, the first member 21' may also be referred to as a sender, a user, a fan, or the like. Thus, the first terminal 21 may also be referred to as a sender terminal, a user terminal, a fan terminal, or the like.

The second terminal 22 may refer to the terminal possessed by the second member 22'. As mentioned above, in the present invention, for example, the second member 22' may also be referred to as a receiver, a creator, or the like. Thus, the second terminal 22 may also be referred to as a receiver terminal, a creator terminal, or the like.

Hereinafter, in describing the present apparatus 10, the first terminal 21 of the first member 21' will be referred to as a user terminal 21 of a user 21' (fan), and the second terminal 22 of the second member 22' will be referred to as a receiver terminal 22 of a receiver 22' (creator).

Examples of each of the plurality of terminals 20 may include any type of wired or wireless communication device such as Personal Communication System (PCS), Global System for Mobile communication (GSM), Personal Digital Cellular (PDC), Personal Handy-phone System (PHS), Personal Digital Assistant (PDA), International Mobile Telecommunication (IMT)-2000, Code Division Multiple Access (CDMA)-2000, Wideband Code Division Multiple Access (W-CDMA), a Wireless Broadband Internet (Wibro) terminal, a smartphone, a smart pad, a tablet personal computer (PC), a laptop, a wearable device, and a desktop, but the present invention is not limited thereto.

The present apparatus 10 may be linked to each of the plurality of terminals through a network 30 and transmit and receive data to and from each of the plurality of terminals 20.

Examples of the network 30 may include a 3rd Generation Partnership Project (3GPP) network, a Long Term Evolution (LTE) network, a World Interoperability for Microwave Access (WIMAX) network, the Internet, a Local Area Network (LAN), a Wireless Local Area Network (WLAN), a Wide Area Network (WAN), a Personal Area Network (PAN), a Bluetooth network, a Near-Field Communication (NFC) network, a satellite broadcasting network, an analog broadcasting network, a Digital Multimedia Broadcasting (DMB) network, and the like, but the present invention is not limited thereto, and the network 30 may include various other wired/wireless communication networks. The present apparatus 10 will be described in more detail below.

Referring to FIGS. 1 to 6, the present apparatus 10 may include a menu identifier 11, the controller 12, and the member DB 13.

Figure 3:
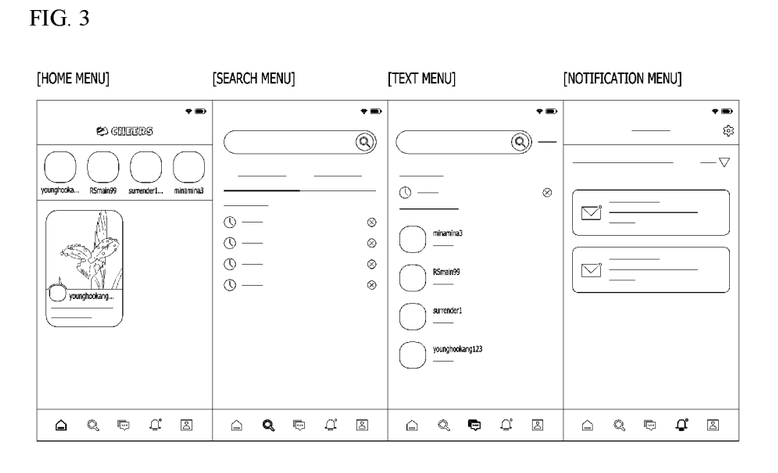
Figure 4:
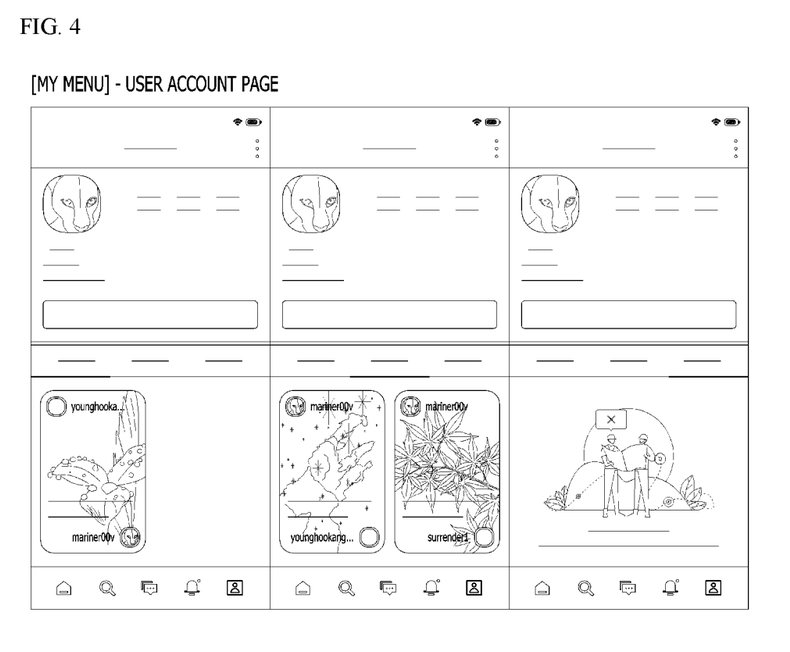

The menu identifier 11 may identify any one menu selected by the user 21' among a plurality of menus as a selected menu. Here, for example, as illustrated in FIGS. 3 and 4, the plurality of menus may include a Home menu, a Search menu, a Text menu, a Notification menu, and a My menu.

When the user terminal 21 is connected to the present apparatus 10 (that is, connected to the present app or the present program provided by the present apparatus 10), the menu identifier 11 may display the plurality of menus on a screen of the user terminal 21, and then may identify any one menu selected by the user 21' among the plurality of menus as a selected menu.

In response to the identification by the menu identifier 11, the controller 12 may control the operation of the user terminal 21 so that a screen corresponding to the selected menu selected by the user 21' is displayed on the screen of the user terminal 21 possessed by the user 21'.

The controller 12 may control the operation of each of the plurality of terminals 20 other than the user terminal 21, and for example, may control screen display on each terminal.

In a case where the selected menu identified by the menu identifier 11 is the Text menu, the controller 12 may provide a text writing screen to the user terminal 21, and in a case where, after cheering-related text information is input on the text writing screen on the user terminal 21, a request to send the cheering-related text information is made, for the receiver 22' in the text information (that is, the receiver corresponding to receiver account ID information in the text information) to check a text message corresponding to the text information, the controller 12 may send the text message to the receiver terminal 22 corresponding to an account of the receiver 22'.

Here, the user terminal 21 may refer to a fan terminal possessed by a fan 21' (user) of the receiver who cheers for the receiver 22' and wants to communicate with the receiver.

The receiver terminal 22 may refer to a creator terminal possessed by a creator 22' (receiver) who engages in artistic activities and wants to communicate with fans. Here, the artistic activities may refer to various art-related activities such as musical activities, lyric writing, composing, drawing (painting), writing, and contents production, but the present invention is not limited thereto, and various other art-related activities may be applied. Accordingly, for example, a creator may be a user (a celebrity) in various fields such as a singer, a composer, a lyric writer, an artist, a web cartoonist, an author (of a novel or the like), a youtuber, a broadcaster, an announcer, a comedian, and a contents producer. The Text menu will be described in more detail below with reference to FIGS. 5 and 6 to help understanding thereof.

Figure 5:
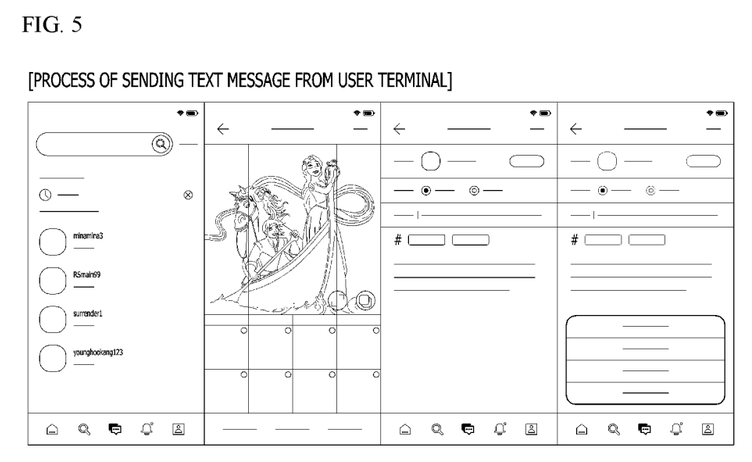
Figure 6:
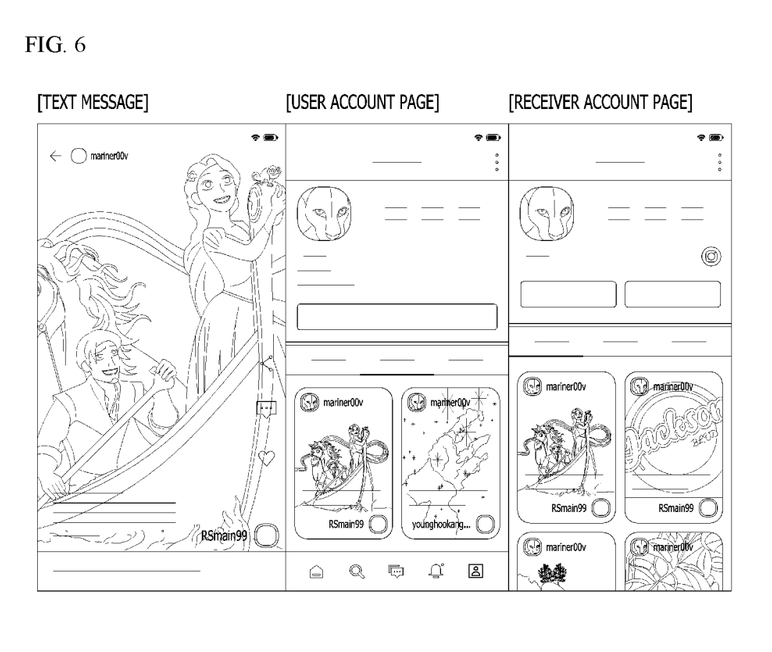

Referring to FIGS. 5 and 6, the text writing screen may refer to a screen that enables writing text (message, letter) information to be sent to the receiver 22' by the user 21'. The text information that may be input in the text writing screen may include cheering-related text information or the like which is cheering-related information to be sent to the receiver 22' by the user 21'.

When the user terminal 21 receives cheering-related text information from the user 21' through the text writing screen, and then, the user 21' clicks on a Send button provided in one area of the text writing screen, the user terminal 21 may upload the text information input by the user 21' to the present apparatus 10 and make a request to send the text information.

Here, the text information may include at least one of receiver account ID information, text privacy setting information, a text title, text content, and a hashtag. Also, the text information may include image information, and the image information may include at least one of an image (picture), a video (especially, a short clip image having a predetermined size or less), and music (for example, background music). For example, the image information may be input by being selected from data pre-stored in a Gallery space of the user terminal 21.

Here, for example, the receiver account ID information may be input by the user 21' searching for desired account ID information through a search word input box provided on the screen when the Text menu is clicked (selected) and selecting the desired account ID information. For example, when the user 21' clicks on the Text menu, the controller 12 may provide the search word input box on the screen to allow the user 21' to search for account ID information of a receiver, who is the other party the user 21' wants to send a text message to, through the provided search word input box and select the account ID information, and then, for example, when the user 21' selects (clicks on) account ID information of the receiver 22' that is found through searching, the controller 12 may, on the screen of the user terminal 21, display the text writing screen in which the account ID information of the receiver 22' is filled in a recipient input box.

The text privacy setting information is setting information relating to an extent to which the text message attempted to be sent to the receiver 22' by the user 21' will be open and may include a Public selection box that enables the text message to be open to the public and a Recipient Only selection box that enables the text message to be open only to the recipient. For example, in a case where the user selects the Public selection box, and "public" is input as the text privacy setting information, the text message sent to the receiver 22' by the user 21' may be visible to (may be able to be checked by) all users (all viewers) connected to a receiver account page corresponding to the account of the receiver in addition to being visible to the receiver 22' and the user 21' (sender). On the other hand, in a case where the user selects the Recipient Only selection box, and "recipient only" is input as the text privacy setting information, the text message sent to the receiver 22' by the user 21' may be visible to (may be able to be checked by) only the receiver 22' and the user 21' (sender). For example, "public" may be set as default of the text privacy setting information.

For example, in a case where a click on the Send button by the user 21' is detected after the text information is input through the text writing screen on the user terminal 21, the controller 12 may display a popup window including a Send Text item, a Temporarily Save item, and a Cancel item on the screen of the user terminal 21 as illustrated in FIG. 5, and then, for example, when the user 21' clicks on the Send Text item, the controller 12 may detect that a sending request has been made and may send the text message corresponding to the text information input by the user 21' to the receiver terminal 22 to enable the receiver 22' corresponding to the receiver account ID information input in the text information to check the text message.

In a case where the request to send the text information is made after "public" is input as the text privacy setting information in the text information, the controller 12 may send the text message to the receiver terminal 22 for the text message to be able to be exposed on a screen of a terminal of each connected member connected to the receiver account page of the account of the receiver 22' (that is, for the text message to be visible to all users connected to the receiver account page).

An example of the text message sent to the receiver terminal 22 due to the sending request from the user terminal 21 is shown in the first image of FIG. 6.

Upon completion of the sending of the text message to the receiver terminal 22, the controller 12 may control the operation of each of the receiver terminal 22 and the user terminal 21 so that the sent text message is exposed on each of a Received Text item in the receiver account page corresponding to the account of the receiver 22' and a Sent Text item in a user account page corresponding to an account of the user 21' (sender).

That is, upon completion of the sending of the text message from the user terminal 21 to the receiver terminal 22, by the controller 12, a record of the sent text message is left through the Sent Text item in the user account page, and in this way, the content of the corresponding text message may be able to be checked by (that is, visible to) all connected members connected to the user account page. Also, by the controller 12, a record of the sent text message is left through the Received Text item in the receiver account page, and in this way, the content of the corresponding text message may be able to be checked by (that is, visible to) all connected members connected to the receiver account page.

Here, under the text message exposed through the Received Text item in the receiver account page (for example, the text message sent to the receiver 22' by the user 21'), replies (comments) evaluating or cheering for the corresponding text message may be left by connected members connected to the receiver account page.

The text message sent from the user terminal 21 to the receiver terminal 22 may be controlled by the controller 12 so that the text message is visible to all users (members) connected to each of the receiver account page and the user account page in addition to being visible to the receiver 22' and the user 21' (sender) (that is, the text message is visible to a third party other than the receiver and the sender).

For example, the user account page may refer to a page shown when the user 21' clicks on (selects) the My menu among the plurality of menus through the user terminal 21. For example, the receiver account page may refer to a page shown when the receiver 22' clicks on (selects) the My menu among the plurality of menus through the receiver terminal 22.

The user terminal 21 may send a text message to at least one of the other terminals 22, 23, and the like excluding the user terminal 21 among the plurality of terminals 20. Text messages sent from the user terminal 21 to at least one of the other terminals may be exposed on the screen through the Sent Text item in the user account page as mentioned above.

Also, the user terminal 21 may, from at least one of the other terminals 22, 23, and the like, receive at least one text message written and sent by at least one of the other terminals. Text messages received from at least one of the other terminals by the user terminal 21 may be exposed on the screen through the Received Text item in the user account page as mentioned above.

Meanwhile, for example, in a case where the selected menu identified by the menu identifier 11 is the Home menu, the controller 12 may display a home screen shown in the first image of FIG. 3 on the screen of the user terminal 21.

Here, for example, the home screen may include a first area and a second area, the first area may be an area in which a list of account IDs of members (that is, creators) the user 21' has registered as being a fan of (followed) is exposed, and the second area may be an area in which at least one text message the user 21' has received from other members is exposed (displayed). For example, on the home screen, the first area may be one area at an upper end, and the second area may be one area at a lower end.

For example, in a case where the selected menu identified by the menu identifier 11 is the Search menu, the controller 12 may display a search screen shown in the second image of FIG. 3 on the screen of the user terminal 21.

The user 21' may perform a user search or a hashtag search through inputting a search word on the search screen. Through the user search, the user 21' may search for a specific member (for example, a specific creator) the user 21' wants to search for among other members by inputting a search word and may find a member who matches information input as the search word by the user 21'. Through the hashtag search, the user 21' may find a post having a hashtag that matches information input as a search word by the user 21'.

For example, in the case where the selected menu identified by the menu identifier 11 is the Text menu, the controller 12 may display a first screen for sending text that is shown in the third image of FIG. 3 on the screen of the user terminal 21. Here, the first screen for sending text may include a search word input box, and through the search word input box, the user 21' may search for and select account ID information of a receiver to whom the user 21' wants to send a text message. Then, when account ID information of a specific receiver is selected, as mentioned above, the text writing screen may be exposed (displayed) on the screen of the user terminal 21. By clicking on the Text menu on the user terminal 21, the user 21' may send a text message to a desired member (for example, a creator) through the Text menu.

For example, in a case where the selected menu identified by the menu identifier 11 is the Notification menu, the controller 12 may display a notification screen shown in the fourth image of FIG. 3 on the screen of the user terminal 21. The notification screen may be a screen on which a list of multiple types of notification information provided to the user 21' is displayed. Here, examples of the multiple types of notification information may include reception notification information notifying that a text message has been received, announcement notification information provided by the present apparatus 10, conversation request notification information notifying that a conversation request has been made, and the like, but the present invention is not limited thereto, and the user may receive various other notifications generated by the present apparatus 10 when using the present apparatus 10. The user 21' may, through the Notification menu, check various notifications sent to the user 21'. For example, the notifications sent to the user 21' may be set to be exposed on the screen through the Notification menu only for a predetermined amount of time (for example, 30 days) after the notifications are received and may be set to be not exposed on the screen after the predetermined amount of time.

For example, in a case where the selected menu identified by the menu identifier 11 is the My menu, the controller 12 may display a My Page screen corresponding to the user account page that is shown in FIG. 4 on the screen of the user terminal 21.

Here, the My Page screen (that is, the user account page), may include a third area in which profile information of the user is displayed and a fourth area in which text-related information is displayed.

The third area may include, as profile information, response rate information, number-of-fans information, number-of-likes information, a user name, and an Edit Profile item. Here, for example, the number-of-fans information may refer to information on the number of other members that the user has designated as being a fan of, that is, the number of creators that the user has registered as being a fan of. For example, the number-of-likes information may refer to information on the number of other members who have designated the user 21' as their fan. For example, the response rate information may refer to information on a ratio of the number of text messages to which the user 21' has replied (for example, left a comment or answered) to the number of text messages received from other members (that is, the total number of received text messages).

The fourth area is an area in which information on a text message relating to the user 21' is displayed and may include a Received Text item (a Received Text tab), a Sent Text item (a Sent Text tab), and a Likes item (a Likes tab). The Received Text item may refer to an item that allows text messages that the user 21' has received from other members to be displayed on the screen. The Sent Text item may refer to an item that allows text messages that the user 21' has sent to other members to be displayed on the screen. For example, the Likes item may refer to an item that allows text messages that the user 21' has pressed "Like" among the text messages received from other members and the text messages sent to other members to be displayed on the screen. That is, the Received Text item may refer to an item that allows the user to view text messages that the user has received from other members, the Sent Text item may refer to an item that allows the user to view text messages that the user has sent to other members, and the Likes item may refer to an item that allows the user to view text messages that the user has pressed "Like."

For example, in the case where the selected menu identified by the menu identifier 11 is the Text menu, the controller 12 may display a text-related screen shown in FIGS. 5 and 6 on the screen of the user terminal 21. By inputting text information through the text-related screen, the user 21' may send a text message to another member (for example, the receiver 22').

Also, for example, in a case where a sending request is made after text information is input on the user terminal 21, the controller 12 may, while sending a text message to the receiver terminal 22 in response to the sending request, charge the user terminal 21 with a fee for sending the text message (a text message sending fee). Here, the amount of the fee (text message sending fee) may be set and changed to various values by a manager (not illustrated) managing the present apparatus 10, and for example, may be set to 50 won, 100, won, or the like.

That is, for example, when the user 21' who is a fan attempts to send a text message to the receiver 22' who is a creator, the controller 12 may charge the user 21' with a fee for sending the text message. Then, for example, for charged amounts charged due to text messages being sent from the plurality of terminals 20 of the plurality of members 20' using the present apparatus 10, the controller 12 may calculate the charged amounts in an app store through which the present app is distributed (for example, Google store, Apple store, or the like) and then process the calculated charged amounts to be accumulated (deposited) in a business savings account pre-registered in the present apparatus 10. Then, the controller 12 may process an amount corresponding to a certain proportion of the calculated charged amounts accumulated in the business savings account to be deposited in a savings account of a receiver (creator) corresponding to the text message for which a fee has been charged.

Here, for example, the business savings account pre-registered in the present apparatus 10 may refer to a savings account of a business corresponding to the present apparatus 10 (that is, a business to which the manager managing the present apparatus belongs).

For example, in a case where thirty members 20' among the plurality of members 20' have sent a text message to the receiver terminal 22 of the receiver 22', the controller 12 may charge each terminal of the thirty members 20' with 100 won as a fee for sending the text message. Accordingly, since an amount corresponding to a total of 3,000 won (that is, 30 members×100 won=3,000 won) is charged due to the receiver 22', the controller 12 may allow an amount (for example, 1,000 won) corresponding to a certain proportion of the total of 3,000 won, which is the amount charged due to the receiver 22' (that is, the amount with which the thirty members 20' are charged) (or the calculated charged amount), to be deposited in (paid, provided, or transferred to) a savings account of the receiver 22' that the receiver 22' has pre-registered in the receiver terminal 22. Accordingly, by providing the amount corresponding to the certain proportion to the receiver 22', the controller 12 may allow income to be generated for the receiver 22' using the present apparatus 10.

For example, after the controller 12 provides a text message to the receiver terminal 22, the receiver 22' may either respond to or not respond to the text message sent from the user 21' who is a fan of the receiver 22'. Here, for example, as a response to the received text message, the receiver 22' may leave a comment under or answer the corresponding text message. When the receiver 22' has not left a comment under or answered the corresponding text message, the controller 12 may consider as "no response."

The above-described present invention (that is, the present apparatus 10 and the present system 100) may provide the following unique attributes and advantageous effects compared to the existing SNS platforms (for example, YouTube, Instagram, Facebook, and the like).

For example, the present invention may provide an environment in which fan-directed communication is possible in a [fan→creator] direction. Also, the present invention may allow the user 21' to send a message (text message) easily and effectively to a desired creator. Also, according to the present invention, since a user sending a text message is charged with a fee when sending the text message, an exchange of malicious text messages between members (users) may be reduced within the present platform, and thus sincere communication and cheering may occur between the members (users).

Also, the present invention may allow a fan to generate an added value that may be immediately felt, instead of simply supporting a creator. That is, according to the present invention, a text message sent from the user 21', who is a fan, to the receiver 22', who is a creator, may be, instead of being visible only to the two (that is, the user and the receiver), visible to the public who are the third party (that is, open, exposed, or provided also to other connected members connected to each of the user account page and the receiver account page). In this way, by allowing the text message to be open also to the public, the present invention may, from the perspective of the user 21' who is a fan, make the fan feel satisfactory about himself or herself, and specifically, make the fan have faith that his or her text message will be reliably sent to the other party (receiver), make the fan feel like having a comparative advantage over a fan who does not send text, and enable the fan to check reaction of other fans (that is, fans connected to the receiver account page other than the user 21') to the text message that the user 21' has sent to the other party, thus providing a fun-inducing factor. Also, by allowing the text message to be open also to the public, the present invention may allow the user 21' to indirectly stimulate and promote reaction of a creator, who is the other party to whom the user 21' has sent the text message, to the text message sent by the user 21', and accordingly, the user 21' may more effectively deliver his or her text message to the creator.

Also, through provision of the present platform (in particular, through provision of a user account page or a receiver account page on which received and sent text messages are exposed), the present invention may allow the present platform to be utilized as a space for communication and cheering between a fan and a creator (an author or the like), allow the present platform to be utilized as a playing space between fans, and enable a creator to receive feedback on his or her work from fans. Also, through provision of the present platform, the present invention may enable a fan to suggest a content material to a creator, and in this way, the creator may develop various activities through communication with fans instead of just supplying content to the fans, the creator may have an opportunity to promote himself or herself and promote his or her work, and the creator's burden on content production may be reduced. Also, from the business perspective, the present invention may, through provision of the present platform, enable the present platform to be utilized as a medium for an organization/business to contact a creator and provide an environment that facilitates communication and collaboration seeking between an organization/business and a creator. In the present invention, for example, the user account page may also be referred to as a fan page or the like.

Figure 2:
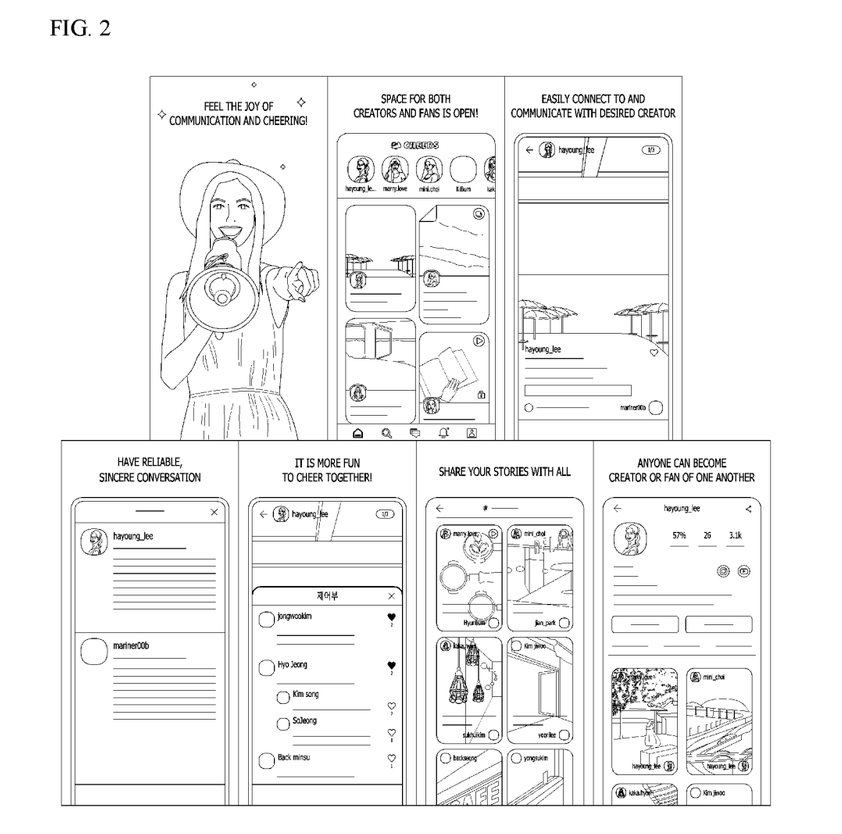
FIGS. 2 to 6 are views schematically illustrating implementation examples of a cheering communication service provided by the cheering communication apparatus according to one embodiment of the present invention.

Also, by providing the present platform as illustrated in FIG. 2, the present invention may enable the plurality of members 20' using the present apparatus 10 to feel joy from communication and cheering, enable a member to easily connect to and communicate with a desired creator, enable a member and a creator to have a reliable, sincere conversation, increase joy from cheering by allowing fans to cheer together, make a text message sent from a fan to a creator to be visible to other fans of the creator so that the other fans may communicate while looking at the text message together, and allow any of the members using the present apparatus 10 to be a creator or a fan of each other. Also, the present apparatus 10 may provide the following functions.

For example, as mentioned above, when a sending request is made from the user terminal 21, the controller 12 may generate a text message including text information input by the user 21', send the text message to the receiver terminal 22, and allow the text message to be exposed on the Received Text item in the receiver account page on the receiver terminal 22. Here, the text message exposed on the Received Text item of the receiver account page may be able to be checked by all of the receiver 22', the user 21', and other connected members, instead of being able to be checked only by the receiver 22' and the user 21' corresponding to the text message, due to being able to be exposed on a terminal of each connected member connected to the receiver account page among the plurality of members 20', and the receiver 22', the user 21', and the other connected members may be able to leave a comment after reading the corresponding text message.

Here, for example, in a case where, after a text message is sent from the user terminal 21 to the receiver terminal 22, it is detected that, in relation to the text message, some connected members including the user 21' (for example, a total of six connected members including third to seventh members in addition to the user 21') among connected members (for example, 2,000 members) connected to the receiver account page have left a comment under the text message, and a direct meeting (that is, a direct offline face-to-face meeting) has been decided between some of the connected members who left a comment, the controller 12 may generate a location sharing map when the text message that has led to deciding the direct meeting satisfies a predetermined alarm standard and may provide the location sharing map to each of the terminals possessed by some of the connected members who are the users related to the direct meeting.

Here, the predetermined alarm standard may refer to a point in time that corresponds to a predetermined amount of time (for example, two hours) before a direct meeting date corresponding to the direct meeting. The direct meeting date may include year, month, day, and time information (hour, minute). Also, the location sharing map may refer to data in which i) current location information of each terminal possessed by some of the connected users related to the direct meeting and ii) shortest movement path information from the current position of each terminal of some of the connected members to the location of a direct meeting place are displayed on a map.

Here, the current location information may be information obtained in real time through a global positioning system (GPS) sensor embedded in each terminal. In the present invention, for example, description will be given assuming that each terminal of some of the connected members is a terminal that is easy to move and carry (for example, a smartphone, a tablet PC, or the like).

In a case where, after the location sharing map is provided to each terminal possessed by some of the connected members, all of the current location information of each terminal possessed by some of the connected members is determined (detected) as being located within a predetermined radius (for example, 200 m) from the location of the direct meeting place for a predetermined amount of time (for example, 10 minutes), the controller 12 may recognize that some of the connected members have all gathered at the direct meeting place and the direct meeting has taken place in reality and may control the location sharing map to not be provided to each terminal possessed by some of the connected members any more (that is, stop providing the location sharing map to each terminal possessed by some of the connected members).

Here, when the controller 12 generates and provides the location sharing map, when, based on a point in time at which a text message has satisfied the predetermined alarm standard, it is detected that the GPS sensor of each terminal of some of the connected members is turned off at the point in time, the controller 12 may control the GPS sensor to be forcibly turned on, obtain, in real time, the current location information of each terminal of some of the connected members from the turned-on GPS sensor, and then generate and provide the location sharing map. Here, when all of the current location information of each terminal possessed by some of the connected members is determined as being located within a predetermined radius from the location of the direct meeting place for a predetermined amount of time as mentioned above, the controller 12 may stop providing the location sharing map to each terminal of some of the connected members and then control the GPS sensor of each terminal of some of the connected members to return to a state before the GPS sensor is controlled to be forcibly turned on (that is, when the GPS sensor has been turned off before being controlled to be forcibly turned on, control the GPS sensor of the corresponding terminal to be turned off after the controller 12 stops providing the location sharing map).

Through provision of the location sharing map, the present apparatus 10 may, in moving to the direct meeting place, enable some of the connected members to each receive the fastest path to arrive at the direct meeting place through the shortest movement path information and move to the direct meeting place. Also, through provision of the location sharing map, the present apparatus 10 allows a plurality of members (especially, some connected members), who are scheduled to meet at the direct meeting place, to check the current location of each other in real time on the day of the direct meeting, and thus, when a specific member is late for the appointed time, other members may easily check the current location of the corresponding member without separately contacting (calling) the corresponding member to check the current location. Also, since the present apparatus 10 provides the location sharing map and forcibly collects real-time information of the current location information of each terminal from a point in time that corresponds to a predetermined amount of time (for example, three hours) before the direct meeting date to a point in time at which all of the current location information of each terminal possessed by some of the connected members is detected as being located within a predetermined radius from the location of the direct meeting place for a predetermined amount of time, unnecessary collection of location information may be eliminated, and a meeting between the plurality of members (that is, some of the connected members) who are scheduled to directly meet may be facilitated.

Also, in a case where it is detected that a direct meeting has been decided between some of the connected members before a location sharing map is generated, the controller 12 may display a direct meeting place recommendation button in one area of the screen of the user terminal 21 for recommendation of a direct meeting place. Here, in a case where a click input of the user 21' on the direct meeting place recommendation button is detected, the controller 12 may, based on the current location information of each terminal of some of the connected members, generate a plurality of radius areas about the current location information on the map for each piece of current location information (that is, generate six radius areas because the number of some of the connected members is six), may identify an overlapping area between the generated plurality of radius areas, and may provide the location of any one point located in the identified overlapping area as a recommended location for recommendation of a direct meeting place to the user terminal 21. Here, in a case where the user 21' has answered "okay" to the recommended location of the direct meeting place provided to the user terminal 21, the controller 12 may determine the recommended location as the location of the direct meeting place and then share information on the determined location of the direct meeting place with each terminal of some of the connected members to allow a direct meeting to take place between some of the connected members at the location of the direct meeting place. In this way, after the location of the direct meeting place is determined, the controller 12 may generate the location sharing map in consideration of the determined location of the direct meeting place.

Here, for example, the location of the direct meeting place may be an indoor space such as a multi-use facility or an outdoor space such as a park or an amusement park. For example, the multi-use facility may be a café or a restaurant. By allowing the location of any one point in the overlapping area to be determined (selected) as the location of the direct meeting place, the present apparatus may prevent at least some members of some of the connected members (that is, six users, for example) from being dissatisfied due to feeling that the location of the direct meeting place is too far from them compared to other members, when a meeting at a specific offline place is scheduled between some of the connected members. That is, the present apparatus 10 may allow a direct meeting to take place at a fair location that is at similar distances from some of the connected members in consideration of the locations of some of the connected members.

Also, assuming that some of the connected members are actually meeting on the direct meeting date at the location of the direction meeting place, while the direct meeting is taking place, the user 21' may want to move to a specific multi-use facility in some cases. That is, for example, some of the connected members may first meet and eat at the location of the direct meeting place (for example, the location of a pasta restaurant) and then want to move to a multi-use facility such as a café in some cases.

In such a case, the controller 12 may provide a multi-use facility recommendation button on the screen of the user terminal 21 to allow the user 21' to receive recommended information on the multi-use facility to go next.

Then, in a case where the user 21' has made a selection input on the multi-use facility recommendation button, in response to the selection input, the controller 12 may, in order to recommend locations of multi-use facilities that some of the connected members may go next, identify a plurality of multi-use facilities located within a predetermined radius (for example, 500 m) from the current location of the user terminal 21 based on a selection input time point, at which the selection input has been made, as a plurality of recommended multi-use facilities.

Then, based on the selection input time point at which the user 21' has made a selection input on the multi-use facility recommendation button, the controller 12 may, among the identified plurality of recommended multi-use facilities (for example, ten recommended multi-use facilities), distinguish identifiers corresponding to available multi-use facilities that are available at the selection input time point and identifiers (icons) corresponding to unavailable multi-use facilities that are unavailable at the selection input time point from each other, display the identifiers on the map, and provide the identifiers to the user terminal 21. For example, the controller 12 may display the identifiers of the available multi-use facilities with red or with a first size and may display the identifiers of the unavailable multi-use facilities with black or with a second size smaller than the first size.

Here, business hours may be different for each of the plurality of recommended multi-use facilities, and since each of the plurality of recommended multi-use facilities may suddenly close for reasons such as personal circumstances, vacation, a family event, or an accident in some cases, closing periods may be different for each of the multi-use facilities.

In this way, based on the selection input time point at which the user 21' has selected the multi-use facility recommendation button, identifiers of available multi-use facilities that are currently available to the user 21' at the selection input time point and identifiers of unavailable multi-use facilities that are currently unavailable are distinguished from each other in consideration of the current business status (that is, whether the multi-use facility is currently open or not open) that takes into account differences in closing periods (suddenly closing periods) and differences in business hours between the identified plurality of recommended multi-use facilities due to personal circumstances, vacation, family events, or accidents, the identifiers are displayed in different manners on a map, and the controller 12 provides the map to the user terminal 21 to enable the user 21' to quickly decide on a multi-use facility to go next.

Here, for example, information on closing periods (suddenly closing periods) of a specific multi-use facility (that is, information on whether the specific multi-use facility is closed due to personal circumstances or closed due to vacation, a family event, or an accident) may be determined through real-time analysis of social data uploaded by a plurality of users on the Internet in relation to the corresponding multi-use facility. The information on closing periods may be information on closing periods not stated in information on business hours of the corresponding multi-use facility that is pre-registered on a portal site (for example, Naver). For example, the social data may be data such as a post uploaded to Instagram, Facebook, or the like, a Naver blog post, or a news article.

Also, the controller 12 may allow the map to be easily utilized when some of the connected members gathered at a specific place wants to move to another multi-use facility after a certain amount of time and wants to quickly search for multi-use facilities that are available right now.

Also, for example, the receiver 22' may upload a plurality of pieces of promotion post information to the receiver account page through the receiver terminal 22. Here, for example, in a case where the receiver 22' is holding an event such as a signing event or a bazaar at a specific place (promotion place), the promotion post information may be information for promoting the held event. Members who are fans of the receiver 22' may check the plurality of pieces of promotion post information uploaded by the receiver 22' and based on the promotion post information, participate in an event (a signing event, a bazaar, or the like) corresponding to the promotion post information.

Here, for example, the user 21' may check the plurality of pieces of promotion post information uploaded to the receiver account page, and here, the following functions may be provided for convenience of checking when the user 21' checks the promotion post information.

In a case where it is detected that the user terminal 21 is connected to the receiver account page, the controller 12 may display a list of the plurality of pieces of promotion post information uploaded to the receiver account page on the screen of the user terminal 21.

Here, for example, in one area of a display area of a first piece of promotion post information which is any one piece of promotion post information among the plurality of pieces of promotion post information in the list displayed on the screen of the user terminal 21, a first button which is a button that enables a first piece of promotion location display map information, in which a promotion location corresponding to the first piece of promotion post information is displayed on a map, to be provided may be included.

In a case where an input on the first button has been made by the user 21', the controller 12 may, based on the input, provide the first piece of promotion location display map information to the user terminal 21, and here, as will be described below, the first piece of promotion location display map information may be provided (displayed, exposed) in different display manners according to an input method of the user 21'.

As a specific example, in a case where it is detected that the user 21' has made a selection input (click input) on the first button corresponding to the first piece of promotion post information for a predetermined amount of time (for example, one second) through the user terminal 21 (that is, in a case where it is detected that the user 21' has simply clicked the first button and then immediately detached the finger from the first button), the controller 12 may control the operation of the user terminal 21 so that the first piece of promotion location display map information corresponding to the first piece of promotion post information in the list to be displayed throughout a new page which is different from the current screen page of the user terminal 21 through which the list of the plurality of pieces of promotion post information is currently exposed.

On the other hand, in a case where it is detected the user 21' is pressing the first button for a predetermined amount of pressing input time (for example, two seconds) or more, the controller 12 may recognize the user's pressing as a signal requesting the first piece of promotion location display map information to be displayed by being overlaid as a popup window in a partial area of the current screen of the user terminal 21 through which the list is exposed, instead of recognizing the user's pressing as requesting the first piece of promotion location display map information to be displayed through the new page, and may control the operation of the user terminal 21 so that the first piece of promotion location display map information is displayed as a popup window in the partial area on the screen of the user terminal 21 after the predetermined amount of pressing input time (for example, two seconds) passes from the point in time at which the user 21' first presses the first button (that is, two seconds after the user 21' first presses the first button).

Here, in a case where it is detected (identified) that the position at which the finger of the user 21' that was pressing the first button is detached from the screen of the user terminal 21 is a position within a button area corresponding to the first button in the state in which the first piece of promotion location display map information is being displayed as a popup window in the partial area on the screen of the user terminal 21, the controller 12 may control the operation of the user terminal 21 so that the first piece of promotion location display map information displayed as a popup window on the screen of the user terminal 21 is not displayed on (that is, disappears from) the screen of the user terminal 21 at the point in time at which the finger of the user 21'*is* detached from the screen at the position within the button area. Accordingly, since, when the finger of the user 21' that was pressing the first button is detached at the position within the button area, the first piece of promotion location display map information displayed as a popup window may immediately disappear as soon as the finger is detached from the screen, the controller 12 may display the first piece of promotion location display map information in the partial area while the finger of the user 21' is pressing the button area and allow the user 21' to temporarily check location information of the corresponding first business. Here, since the screen of the user terminal 21 is implemented using a touch panel or the like, the position at which the finger is detached from the screen of the user terminal 21 may be identified through the touch panel or the like.

Here, on the screen of the user terminal 21, the partial area in which the first piece of promotion location display map information is displayed and the button area corresponding to the first button may be displayed so as not to overlap each other.

In a case where it is detected (identified) that, in the state in which the first piece of promotion location display map information is being displayed as a popup window in the partial area on the screen of the user terminal 21, the finger of the user 21' that was pressing the first button is dragged to a position within the partial area that deviates from the button area, and thus the position at which the finger of the user 21' is later detached from the screen of the user terminal 21 is the position within the partial area, the controller 12 may control the operation of the user terminal 21 so that, even after the finger of the user 21' is detached from the screen at the position within the partial area, the first piece of promotion location display map information displayed as a popup window on the screen of the user terminal 21 is continuously displayed on (that is, does not disappear from) the screen of the user terminal 21. Accordingly, since, when the finger of the user 21' that was pressing the first button is detached at the position within the partial area, the first piece of promotion location display map information displayed as a popup window may remain displayed on the screen of the user terminal 21 regardless of whether the finger is detached from the screen, the controller 12 may allow the user 21' to check the first piece of promotion location display map information displayed in the partial area in more detail by zooming in or out.

According to the above description, according to the point in time at which the user 21' detaches the finger from the screen or the position at which the finger is detached from the screen after the user 21' selects the first button, the present apparatus may differently control the display manner of the first piece of promotion location display map information (that is, whether the first piece of promotion location display map information will be displayed on a new page or displayed as a popup window) and the disappearance or non-disappearance of the first piece of promotion location display map information provided as a popup window.

That is, through provision of the first piece of promotion location display map information, the controller 12 may allow the user 21' to check promotion position-related information in specific promotion post information among the plurality of pieces of promotion post information in the list. In particular, in enabling the user 21' to check the first piece of promotion location display map information which is information on the promotion position corresponding to specific promotion post information, the controller 12 may enable the user 21' to efficiently and conveniently check without having to browse between pages.

Hereinafter, the operational flow of the present invention will be briefly described based on the detailed description given above.

Figure 7:
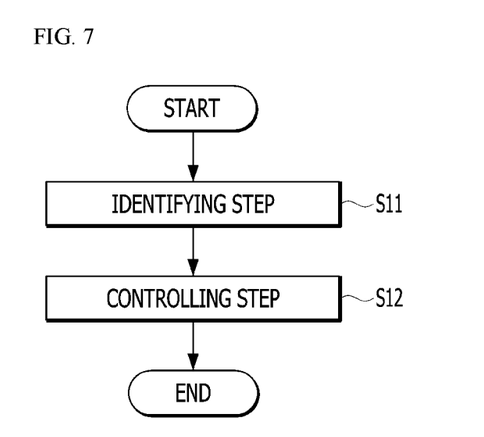
FIG. 7 is an operational flowchart of a cheering communication method according to one embodiment of the present invention.

FIG. 7 is an operational flowchart of a cheering communication method according to one embodiment of the present invention.

The cheering communication method illustrated in FIG. 7 may be performed by the present apparatus 10 described above. Therefore, even when description of the present apparatus 10 is omitted below, the above-given description of the present apparatus 10 may identically apply to the description of the cheering communication method.

Referring to FIG. 7, in step S11, a menu identifier may identify any one menu selected by a user among a plurality of menus as a selected menu.

Next, in step S12, in response to the identification by the menu identifier in step S11, a controller may control a screen corresponding to the selected menu to be displayed on a screen of a user terminal possessed by the user.

Here, in a case where the selected menu is a Text menu, the controller may provide a text writing screen, and in a case where, after cheering-related text information is input on the text writing screen, a request to send the cheering-related text information is made, for a receiver in the text information to check a text message corresponding to the text information, the controller may send the text message to a receiver terminal corresponding to an account of the receiver.

In the above description, steps S11 and S12 may be further divided into additional steps or combined into fewer steps according to an implementation example of the present invention. Also, some steps may be omitted as necessary, or the order between the steps may be changed.

The cheering communication method according to one embodiment of the present invention may be implemented in the form of program instructions, which may be executed through various computer means, and recorded in computer-readable recording media. The computer-readable recording media may include program instructions, data files, data structures, and the like alone or in combination. The program instructions recorded in the media may be those designed and configured especially for the present invention or those known and usable by those of ordinary skill in the art of computer software. Examples of the computer-readable recording media include magnetic media such as a hard disk, a floppy disk, and a magnetic tape, optical media such as a compact disk read-only memory (CD-ROM) and a digital versatile disk (DVD), magneto-optical media such as a floptical disk, and hardware devices such as a ROM, a random access memory (RAM), and a flash memory especially configured to store and execute program instructions. Examples of the program instructions include machine language codes generated by a compiler and high-level language codes that may be executed by a computer using an interpreter or the like. The above-mentioned hardware devices may be configured to operate as one or more software modules to perform the operations of the present invention, and vice versa.

Also, the above-described cheering communication method may be implemented in the form of a computer-executable computer program or an application that is stored in recording media.

The present invention provides an apparatus and method for cheering communication, thereby allowing a fan to more effectively cheer for and communicate with a creator (that is, effectively supporting cheering and communication in a [fan→creator] direction) and allowing income to be generated for the creator to be financially helpful to the creator.

However, the advantageous effects that can be obtained by the present invention are not limited to those mentioned above, and other unmentioned advantageous effects may be present.

The above-given description of the present invention is only illustrative, and those of ordinary skill in the art to which the present invention pertains should understand that the present invention may be easily modified to other specific forms without changing the technical spirit or essential features of the present invention. Therefore, the embodiments described above should be understood as illustrative, instead of limiting, in all aspects. For example, each component described as a single type may be embodied in a distributed manner, and likewise, components described as being distributed may be embodied in a combined form.

The scope of the present invention is shown by the claims below rather than by the detailed description above, and all changes or modifications derived from the meaning and scope of the claims and their equivalent concepts should be construed as falling within the scope of the present invention.

What is claimed is:

1. An apparatus for cheering communication, the apparatus comprising:
  a menu identifier configured to identify any one menu selected by a user among a plurality of menus as a selected menu; and
  a controller configured to, in response to the identification, control a screen corresponding to the selected menu to be displayed on a screen of a user terminal possessed by the user,
  wherein, in a case where the selected menu is a Text menu, the controller provides a text writing screen, and in a case where, after cheering-related text information is input on the text writing screen, a request to send the cheering-related text information is made, for a receiver in the text information to check a text message corresponding to the text information, the controller sends the text message to a receiver terminal corresponding to an account of the receiver,
  upon completion of the sending of the text message to the receiver terminal, the controller controls the sent text message to be exposed on each of a Received Text item in a receiver account page corresponding to the account of the receiver and a Sent Text item in a user account page corresponding to an account of the user,
  in a case where the request to send the text information is made after "public" is input as text privacy setting information in the text information, the controller sends the text message to the receiver terminal for the text message to be able to be exposed on a screen of a terminal of each connected member connected to the receiver account page, thereby enabling the text message sent from the user to the receiver to be checked by the receiver, the user, and all the other connected members connected to the receiver account page corresponding to the account of the receiver and enabling all the other connected members connected to the receiver account page to leave a comment relating to evaluation of the text message or a comment relating to cheering for the text message,
  in a case where, after the text message is sent from the user terminal to the receiver terminal, it is detected that, in relation to the text message, some connected members including the user among the connected members connected to the receiver account page have left a comment under the text message, and a direct meeting has been decided between some of the connected members who left a comment, the controller generates a location sharing map at a point in time that corresponds to a predetermined amount of time before the date and time of the direct meeting and provides the location sharing map to each of the terminals possessed by some of the connected members who are the users related to the direct meeting,
  when generating and providing the location sharing map, at the point in time that corresponds to the predetermined amount of time before the date and time of the direct meeting, the controller obtains in real time, from a turned-on global positioning system (GPS) sensor of each terminal of some of the connected members, the current location information of each terminal of some of the connected members in which the GPS sensor is turned on, generates the location sharing map, and provides the location sharing map to each terminal possessed by some of the connected members, and when it is determined that all of the terminals of some of the connected members in which the GPS sensor is turned on are located within a predetermined radius from the location of a place of the direct meeting, the controller stops providing the location sharing map to each terminal of some of the connected members, in a case where, after the location sharing map is provided, it is determined that all of the terminals of some of the connected members in which the GPS sensor is turned on are located within the predetermined radius from the location of the place of the direct meeting for a predetermined amount of time, the controller recognizes that some of the connected members each having the terminal in which the GPS sensor is turned on have all gathered at the place of the direct meeting and the direct meeting has taken place in reality and controls the location sharing map to not be provided to each terminal possessed by some of the connected members any more, the date and time of the direct meeting include year, month, day, and time information, the location sharing map is data in which current location information of each terminal with a turned-on GPS sensor possessed by connected members among some of the connected members related to the direct meeting and shortest movement path information from the current position of each terminal with a turned-on GPS sensor of the connected members to the location of the place of the direct meeting are displayed on a map, the current location information is information obtained in real time through the GPS sensor embedded in each terminal, the user terminal is a fan terminal possessed by a fan of the receiver who cheers for the receiver and wants to communicate with the receiver, and the receiver terminal is a creator terminal possessed by a creator who engages in artistic activities and wants to communicate with fans.

\* \* \* \* \*